United States Patent [19]
Sato

[11] 3,929,736
[45] Dec. 30, 1975

[54] PROCESS FOR PREPARING RESIN FOR PRINTING INK USE

[75] Inventor: Hisatake Sato, Yokohama, Japan

[73] Assignee: Nippon Oil Company Ltd., Tokyo, Japan

[22] Filed: Apr. 17, 1974

[21] Appl. No.: 461,757

[30] Foreign Application Priority Data
Apr. 17, 1973  Japan.................................. 48-42682

[52] U.S. Cl................................ 260/78.4 D; 260/82
[51] Int. Cl.² ................. C08G 63/18; C08F 240/00
[58] Field of Search........................ 260/78.4 D, 82

[56] References Cited
UNITED STATES PATENTS

| | | | |
|---|---|---|---|
| 2,993,880 | 7/1961 | Aldridge et al. | 260/78.4 D |
| 3,161,620 | 12/1964 | Perkins et al. | 260/78.4 D |
| 3,279,975 | 10/1966 | Yoshii et al. | 260/82 |
| 3,379,663 | 4/1968 | Takei | 260/78.4 D |
| 3,574,792 | 4/1971 | Hayashi | 260/78.4 D |
| 3,709,854 | 1/1973 | Hepworth et al. | 260/82 |
| 3,775,381 | 11/1973 | Hayashi et al. | 260/78.4 D |
| 3,817,953 | 6/1974 | Younger | 260/82 |
| 3,825,624 | 7/1973 | Hirai et al. | 260/82 |

Primary Examiner—Joseph L. Schofer
Assistant Examiner—Maria S. Tungol
Attorney, Agent, or Firm—Sherman & Shalloway

[57] ABSTRACT

A process for preparing a resin suitable for printing ink use, using as the starting oil to be polymerized either a heat-reacted mixture of that fraction having a boiling point of 20° – 80°C. of the thermally cracked product oil of petroleum fractions or a mixture of this heat-reacted mixture with that fraction of a boiling point 140° – 280°C. of the foregoing thermally cracked product oil, which starting oil is polymerized in the presence of a Friedel-Crafts type catalyst, after which the resulting polymer is reacted with an unsaturated carboxylic acid or an anhydride thereof and, if necessary, the resulting reaction product is further reacted with a monohydric alcohol to obtain a resin having a softening point of above 100°C. and soluble in the nonaromatic hydrocarbon solvents.

12 Claims, No Drawings

PROCESS FOR PREPARING RESIN FOR PRINTING INK USE

This invention relates to a process for preparing a resin that is used for the preparation of a printing ink vehicle which uses the aliphatic and alicyclic hydrocarbons as solvents.

More particularly, this invention relates to a process for preparing a resin for printing ink use that is soluble in the nonaromatic hydrocarbon solvents such as the aliphatic and alicyclic hydrocarbons, the preparation of which resin comprises polymerizing with a Friedel-Crafts type catalyst either a reaction mixture obtained by heating at a temperature of 100° – 300°C. that fraction having a boiling point in the range of 20° – 80°C. of the thermally cracked product oil of petroleum fractions and containing diolefins of 5 carbon atoms (hereinafter to be referred to as the $C_5$ fraction) or a mixture of the foregoing reaction mixture with that fraction having a boiling point in the range of 140° – 280°C. of the thermally cracked product oil of petroleum fractions, followed by reacting the so obtained resin with a prescribed amount of an unsaturated carboxylic acid or further by esterifying same with a prescribed amount of a monohydric alcohol to obtain a resin having a softening point of about 100°C.

Printing ink basically consists of a vehicle and a pigment dispersed therein, the other components such as dispersing agents, plasticizers, hardeners, etc., making up the composition being added for either adjusting or modifying the various properties of the basic composition. Again, when the drying of the ink results from the evaporation of the solvent as in those inks typified by the gravure ink or flexoink, the foregoing vehicle is basically composed of a resin and a solvent. Various types of vehicles, depending upon the combinations of the resin and solvent, are being used for printing inks.

The object of the present invention is to prepare a resin which is used in a vehicle whose solvent constituent is principally an aliphatic and/or alicyclic hydrocarbon such as n-hexane, n-heptane, n-paraffin and cyclohexane and; moreover, a resin to be used for those inks that are classified as the solvent evaporating type of inks, especially the gravure and web offset printing inks.

The properties required of a resin to be used for gravure ink are as follows: it must be one which dissolves in the intended solvent; it must be one in which solvents readily separate therefrom; it must be one possessing good wettability with pigments; it must possess good viscosity stability when prepared into an ink; and it must be one which provides printed matter having a satisfactory and uniform luster.

On the other hand, the following properties are required of a resin to be used for web offset ink. The resin must dissolve in the intended solvent, must possess good wettability with pigments, provide a satisfactory luster when the ink prepared therefrom is printed, and must possess good antiemulsifiability.

Further, since the properties of the resin used for the preparation of the flexographic ink and the gravure ink are basically the same, the resin of the present invention can be used for the preparation of the former in the case the solvent does not adversely affect the rubber rollers used in flexography.

While the phenolic resins and rosin-modified phenolic resins are principally used at present for the inks that use as solvents such aliphatic and/or alicyclic hydrocarbons as mentioned above, these resins are not entirely satisfactory when considered from such points as their solubility in solvents, printing effects obtained and cost. Again, notwithstanding the fact that various other resins have been developed, none have been obtained that possess properties that compare favorably with or excel those of the phenolic or rosin-modified phenolic resins.

In view of the foregoing state of affairs, we engaged in extensive research with a view to discovering a method of synthesizing a resin conforming with the foregoing objects, using the cracked oil fractions that are available in great quantities and low cost from the petrochemical industry. As a consequence, we arrived at a process for preparing a new type of modified resin suitable for ink preparation, a description of which is given below.

The $C_5$ fraction used in the present invention is that fraction having a boiling point of 20° – 80°C. of the byproduct oil fractions that are obtained during the production of ethylene, propylene, butenes and butadiene by means of the catalytic cracking or thermal cracking such as the so-called steam cracking, vapor phase thermal cracking and sand cracking, using as starting materials the light or heavy naphtha, kerosene and the light oil fractions, heavy oil fractions or crude oil, and is a fraction that contains the conjugated diolefins such as isoprene, piperylene and cyclopentadiene, the olefinic components such as isopentene, pentene-1 and pentene-2, and the saturated components such as n-pentane and isopentane.

When the foregoing $C_5$ fraction containing such conjugated diolefins as isoprene and piperylene is heat-reacted, a mixture of unsaturated compounds such as unsaturated cyclic and chain compounds is formed by a complicated reaction the principal reaction of which is the Diels-Alder reaction. A heating temperature of less than 100°C. is not practical in this case, because the reaction speed is slow. On the other hand, when 300°C. is exceeded, this also is not suitable, since a large amount of the heavy components is formed. A reaction time of from about one minute to several hours can be used. If desired, the unreacted $C_5$ component can be removed by means of distillation from the reaction mixture obtained as above described by heating and, if further desired, the heavy components of dimer and above can also be removed by distillation. The so obtained fraction is used as the starting oil to be polymerized. The reaction mixture remaining after the $C_5$ component and the heavy components of dimer and above have been distilled off from the heat-reacted product of the $C_5$ fraction will be referred to herein as the "$C_5$ heat-reacted mixture". In proportion as the content of the components of more than 10 carbon atoms increases in the $C_5$ heat-reaction mixture, the softening point of the resin obtained therefrom tends to decline. Hence, for obtaining a resin having a high softening point, it is preferred that the $C_5$ heat-reacted mixture be used as the starting oil after removing the fraction consisting of dimer and above.

This $C_5$ heat-reacted mixture contains a great variety of compounds, and while its exact composition is unknown, it contains 25 – 30% of the various isoprene-piperylene codimers and, in addition, the homodimers of both isoprene and piperylene, as well as small quantities of the isoprenecyclopentadiene codimer, piperylene-cyclopentadiene codimer, dicyclopentadiene, isoprene-olefin codimers and pirylenceolefin codimers.

While the foregoing $C_5$ heat-reacted mixture may be used as the starting oil to be polymerized in this invention, it is also possible in the case where it is intended to raise the softening point of the resulting resin to use mixed with the aforesaid $C_5$ heat-reacted mixture that fraction of the thermally cracked product oil of petroleum fractions (the thermally cracked product oil, as here used, is the same as that which becomes the starting material of the aforementioned $C_5$ fraction) having a boiling point in the range of 140° – 280°C. (this fraction is to be referred to herein as the $C_9$ fraction). The 140° – 280°C. fraction such as described (i.e. the $C_9$ fraction) contains a large quantity of styrene, indene and the alkyl derivatives thereof. While the ratio in which the $C_5$ heat-reaction mixture and the $C_9$ fraction are mixed will vary depending upon the composition of the $C_9$ fraction, suitably used is that roughly on a weight basis ranging between 0.5:1 and 20:1, and preferably between 1:1 and 5:1. When the ratio of the $C_9$ fraction exceeds 1:1, a resin of high softening point becomes readily obtainable, but there is the tendency that the resulting resin becomes difficultly soluble in such nonaromatic solvents as n-hexane and cyclohexane. On the other hand, when the ratio of the $C_9$ fraction becomes less than 5:1, the effects of raising the softening point tends to become less. Hence, the ratio in which the foregoing components is mixed should preferably be in the range of 1:1 to 5:1.

In the process of this invention this $C_5$ heat-reacted mixture of a mixture of this $C_5$ heat-reacted mixture and the $C_9$ fraction is used as the starting oil to be polymerized, and a thermoplastic resin is prepared by polymerizing the foregoing mixtures in the presence of a Friedel-Crafts type catalyst. While the polymerization reaction is usually carried out either by adding the catalyst to the $C_5$ heat-reacted mixture or the mixture of this and the $C_9$ fraction with stirring or by adding the catalyst solution (or a slurry) incrementally to the $C_5$ heat-reacted mixture or a mixture of this and the $C_9$ fraction, it is best to cool the $C_5$ heat-reacted mixture or the mixture of this and the $C_9$ fraction in advance, since this reaction is an exothermic reaction. As the polymerization liquid becomes more viscous as the reaction proceeds and stirring becomes difficult, the polymerization reaction is preferably conducted in a solvent. While as solvents those which are usually inert to the starting reactants and catalyst are used, the use of such aliphatic hydrocarbons as hexane and heptane is not be be desired, since the yield and softening point of the resulting resin are low. On the other hand, when the halogenated hydrocarbons such as methylene chloride and ethylene dichloride are used as the solvent, there is the drawback that the treatment operations following the reaction become complicated as well as that the softening point of the resulting resin becomes low, though the yield of the resin is satisfactory. Conveniently used are the aromatic hydrocarbons, since not only both the yield and softening point of the resin become high but also the color of the resin becomes light. Benzene and toluene are the most satisfactory solvents and hence are to be particularly recommended.

The polymerization may be carried out by either one of the following methods. That is, by a method consisting of preparing a catalyst solution or slurry by adding the catalyst to the aforesaid solvents and then adding the $C_5$ heat-reacted mixture to the so prepared solution or slurry, or a method consisting of adding the catalyst to a liquid mixture of the solvent and the $C_5$ heat-reacted mixture.

The Friedel-Crafts type metal halides are used as catalyst in this invention, particularly suitable being aluminum chloride and boron trifluoride and the complexes thereof with ether and the hydroxyl group-containing compounds.

The catalyst is suitably used at a concentration, based on the starting oil to be polymerized, in a range of 0.1 – 10% by weight, and preferably 0.5 – 5% by weight. A polymerization temperature of 0° – 80°C. and preferably 20° – 60°C., is used. A polymerization time of 30 minutes – 10 hours, and preferably 2 – 5 hours, after the initiation of the polymerization reaction is convenient.

After completion of the polymerization reaction, the catalyst is decomposed by the addition of water or an aqueous alkaline solution to the polymerization solution, following which the latter is washed with water, submitted to distillation to remove the solvent, unreacted reactants and small amount of low polymers, thus obtaining a light yellow resin in the bottom.

According to this invention, an unsaturated carboxylic acid or an anhydride thereof is then reacted with the thermoplastic resin obtained in the above manner to prepare a nonaromatic hydrocarbon-soluble resin having a softening point of about 100°C. This resin will be referred to herein as the acid-modified resin. In this case the reaction is usually carried out for a period ranging preferably from about 30 minutes to 15 hours in either the absence or presence of 0.01 – 0.2 mol based on 100 grams of the aforesaid resin of a radical initiator such as an organic peroxide. A reaction temperature of 80° – 300°C. is preferably used.

The monovalent or polyvalent carboxylic acids or anhydrides thereof of usually 3 – 32 carbon atoms are used as the unsaturated carboxylic acids or anhydrides thereof in the present invention. As typical examples, mention can be made of such as acrylic acid, methacrylic acid, maleic acid, meleic anhydride, tetrahydrophthalic acid and its anhydride, fumaric acid, citraconic acid and itaconic acid.

When the unsaturated carboxylic acid or its anhydride is added in an amount less than 0.1 mol per 100 grams of the resin, the amount of polar groups is small, with the consequence that when such a resin is used as a resin for preparing ink, the wettability of the resin with pigments is poor, and only inferior effects can be obtained when such an ink is used for printing. On the other hand, when 0.2 mol is exceeded, the ink varnish prepared by dissolving the resin in a solvent has an abnormal solution viscosity to make it impossible to prepare an ink. Hence, for adjusting the solution viscosity to a value that would be suitable for an ink varnish, the resin concentration must be reduced to an extreme degree, with the consequence that there are such drawbacks as that not only the luster of the ink obtained suffers, but also uniformly printed matter cannot be obtained. Again, when the amount of acid added is great, the resin becomes insoluble in the nonaromatic hydrocarbons, and hence it becomes impossible to prepare the varnish.

If in the acid addition reaction of this invention an unsaturated carboxylic acid or an anhydride thereof is addition reacted in an amount within the range hereinbefore indicated under the hereinbefore-indicated conditions, the addition can be made at a rate close to 100%. Hence, there is no particular necessity of removing the unreacted acid after the addition reaction but, if necessary, the trace amount of the unreacted acid can be removed by blowing in a heated inert gas.

The acid-modified resin obtained in the above manner can be used as such for preparing the ink varnish by the addition of the various solvents. Further, this acid-modified resin can also be made into a resin for ink use by carrying out the so-called alkyd recipe, which consists of reacting the acid-modified resin with, say, polyhydric alcohols, fatty acids or oils and fats.

However, in the case of this acid-modified resin, there are instances in which the solution stability of the varnish and the printing effects of the ink prepared therefrom are not satisfactory depending upon the class of the pigments that are used in the preparation of the ink. In such a case as this, the viscosity stability of the varnish, the wettability with pigments and the printing effects can be improved in this invention by submitting the acid-modified resin obtained as above described to an esterification reaction with a monohydric alcohol. The alcohol is used in this case in an amount of not more than 1.0 mol, and preferably 0.25 – 1.0 mol, per equivalent of the carboxyl groups contained in the unsaturated carboxylic acid or per ½ equivalent of the acid anhydride groups contained in the acid anhydride used in preparing the acid-modified resin. The esterification reaction is carried out by adding the monohydric alcohol and either heat-melting the acid-modified resin or heating the resin in a state in which it is dissolved in a hydrocarbon solvent such as benzene, toluene or xylene for, say, a period ranging from 30 minutes to 10 hours at a temperature of 150° – 250°C.

The natural or synthetic saturated or unsaturated monohydric alcohols usually of 1 – 24 carbon atoms are used as the monohydric alcohol in this invention. The monohydric alcohols, for example, the lower alcohols such as methyl alcohol, ethyl alcohol and propyl alcohol, and the higher alcohols such as nonyl alcohol, decyl alcohol, lauryl alcohol and oleyl alcohol will do, which alcohols may also be used as mixtures of two or more classes thereof.

The reaction is carried out in a normal atmospheric pressure or pressure reactor, in which the reactants can be heated and stirred. If necessary, an apparatus for removing the water formed during the reaction may be fitted to the reactor. In the case of an acid-modified petroleum resin obtained by the addition of a dibasic acid anhydride, since water is not formed during the esterification reaction and the reaction can be made to proceed smoothly, the provision of a water-removing apparatus is not necessary. When the esterification reaction is carried out using a solvent, the solvent is removed by distillation after the completion of the reaction. When the amount of the monohydric alcohol used is less than 0.25 mol per equivalent of the carboxyl groups contained in the unsaturated carboxylic acid or less than ½ equivalent of the carboxyl groups contained in the acid anhydride used at the time of the acid modification of the resin, there are no manifestation of marked improvements over the acid-modified resin with respect to such points as the viscosity stability of the varnish or printing effects. On the other hand, when the amount of alcohol used exceeds 1.0 mol per equivalent of the carboxyl groups or ½ equivalent of the acid anyydride groups, this anhydride is undesirable, since unreacted alcohol remains behind in the reaction system. Again, when an acid anhydride has been used at the time of the preparation of the acid-modified resin, while it is usually possible to use up to 1.0 mol of the alcohol per ½ equivalent of the acid anhydride groups, the esterification reaction tends to become somewhat difficult when ½ mol is exceeded. Again, there is a tendency to the softening point declining somewhat on account of the esterification, with the consequence that when such a resin is made into ink, its drying speed drops considerably. Hence, when an acid anhydride is used in this invention, the alcohol is preferably used in an amount of 0.25 – 0.5 mol per ½ equivalent of the acid anhydride groups.

Further, when a polyhydric alcohol is used instead of a monohydric alcohol, a polyester reaction is set up between the polyhydric alcohol and two or more molecules of the acid-modified resin either to be convert to a high polymer or become insoluble in the organic solvents. Hence, when such a resin is used for ink preparation, either the viscosity becomes too high or it cannot be made into a varnish. Thus, the use of a polyhydric alcohol is not desirable.

However, it is possible to adjust the softening point and molecular weight of the resin by using a polyhydric alcohol admixed in a small quantity, and thus it is possible to make conjoint use of a polyhydric alcohol with the monohydric alcohol in an amount of the order such that solvent-insoluble gels are not formed. In this case, the polyhydric alcohol can be used in an amount of about 0.5 mol per mol of the monohydric alcohol.

The acid-modified resin or esterified resin obtained as above described has a softening point of above 100°C. and is most suitably used as the resin for preparing gravure and offset ink which use the nonaromatic hydrocarbons as solvent.

Further, the softening point of the acid-modified or esterified resin of the present invention can be raised without impairment of its solubility by reacting these resins at a temperature of, say, 150° – 250°C. with a resol type phenolic resin, with the consequence that the drying time of the resulting ink can be speeded up.

The features of the present invention, when enumerated, are as follows:

1. The resin obtained by the invention process can be used alone for the preparation of gravure and web offset ink and, as compared with the conventional phenolic resins, possesses printing effects, printing properties, and viscosity stability that are comparable, if not superior, to the latter.
2. Ink can be prepared with the same recipes and procedures as in the case with the conventional phenolic resins, and hence the provision of new equipment is not necessary.
3. If necessary, the invention resin can be used conjointly with the conventional phenolic resins.
4. As a resin of light color can be obtained, the development of the color tone is good and color development is satisfactory regardless of the pigment used.
5. The resin can be prepared by a relatively simple process. Hence, the cost involved in its production is small.
6. It is stable with respect to its quality and cost, because it is a synthetic product.

The following examples will now be given for more specifically illustrating the invention, it being understood that these examples are only given for purpose of illustration and that the invention is not to be limited thereto.

EXAMPLE 1

The $C_5$ fraction having a boiling point of 25° – 60°C. of the cracked oil fractions obtained by the steam cracking of naphtha had the composition shown in Table 1.

Table 1

| Composition of the $C_5$ Component | |
|---|---|
| Isopentane | 18.0 Weight % |
| n-pentane | 28.0 |
| n-pentene-1 | 4.2 |
| 2-methylbutene-1 | 7.7 |
| Pentene-2 | 6.5 |
| 2-methylbutene-2 | 4.4 |
| 2-methylpentane | 0.5 |
| Cyclopentane | 1.1 |
| Isoprene | 15.1 |
| Cyclopentene | 3.8 |
| Piperylene | 9.8 |
| Cyclopentadiene | 0.3 |
| Unknown components | 0.6 |

One kg of the fraction having the composition shown in Table 1 was charged to an agitator-equipped autoclave and heated for 30 minutes at a temperature of 230°C., following which the unreacted $C_5$ fraction was removed by distillation. On continuation of the distillation, 185 grams of a fraction boiling at 160° – 176°C. was obtained.

Separately, to a 300-cc 4-necked flask fitted with a stirrer, a thermometer and a nitrogen line were added 10 grams of anhydrous aluminum chloride and 50 grams of toluene while passing in $N_2$ gas. This was followed by adding with vigorous stirring 200 g of the foregoing fraction having a boiling point of 160° – 176°C., the addition being made gradually during a period of 30 minutes after cooling the fraction in advance. The solution temperature inside the flask was maintained at 20° – 25°C. during this time. After completion of the addition, the polymerization reaction was continued for 2 hours and 30 minutes at the same temperature. Following completion of the polymerization reaction, 100 cc of a 5% aqueous NaOH solution was added to the reaction product, which was then stirred for one hour at 50°C. The reaction product was then transferred to a separating funnel and washed three times with water, after which it was submitted to distillation at reduced pressure to remove the solvent, monomers and low polymers and obtain a light yellow resin (I) at a yield of 85%.

The properties of this resin were as follows:

| Resin softening point | 118°C. |
|---|---|
| Color (Gardner) | 5 |
| Bromine value | 67 |

Ths so obtained resin (I) was placed in a stirrer-equipped autoclave and melted by heating same at 180°C., after which maleic anhydride was added at the rate of 9 grams (0.092 mol) per 100 grams of the resin with stirring and reacted with the resin for 5 hours to obtain an acid-modified resin (I-A). The acid-modified resin (I-A) had a softening point of 132°C. and an acid value of 44, and it was soluble in benzene, toluene, n-hexane, n-heptane, cyclohexane, MEK and MIBK.

The resin (I-A) was dissolved in a petroleum type nonaromatic hydrocarbon solvent having an initial boiling point of 70°C. and an end point of 120°C. to prepare a varnish having a resin concentration of 55 weight %. The viscosity of this varnish at 25°C. was 210 centipoises. This varnish was then added separately with the pigments Carmine 6B and Phthalocyanin Blue and mixed and kneaded in a ball mill to prepare, respectively, a red ink and a blue ink in accordance with the following recipe.

| | Parts by weight |
|---|---|
| Pigment | 4 |
| Calcium carbonate | 15 |
| Resin | 30 |
| Solvent | 51 |

When the viscosity of these inks was measured one week later, the rise in viscosity of both inks was no more than 5% of that of the inks immediately after their preparation, thus indicating that the viscosity stability of the inks was satisfactory. Further, when art paper was printed with a gravure press, the drying speed was comparable to that of the case of the phenolic resins, and the luster and uniformity of the printed surface were also similar.

EXAMPLE 2

The fraction of a boiling point 160° – 176°C. (the $C_5$ heat-reaction mixture) obtained in Example 1 and that fraction of a boiling point 140° – 210°C. (of a composition shown in Table 2) of the cracked oil fractions of petroleum were mixed at a ratio of 1:1. Using this mixture as the starting oil to be polymerized, the polymerization reaction was carried out under identical polymerization conditions as in Example 1 to obtain a resin (II).

Table 2

| | Parts by weight |
|---|---|
| Styrene and alkyl derivatives thereof | 35 |
| Indene and alkyl derivatives thereof | 13 |
| Saturated aromatics | 47 |
| Others | 5 |

The resin (II) had a softening point of 138°C. and a bromine value of 46. Maleic anhydride was added to resin (II) at the rate of 12 grams (0.122 mol) per 100 grams of the latter, and by operating as in Example 1 an acid-modified resin (II-A) was obtained. The softening point of resin (II-A) was 155°C., and its acid value was 57. This was followed by adding 2-ethylhexyl alcohol to the so obtained acid-modified resin (II-A) at the rate of 0.5 mol per mol of the maleic anhydride that was added and carrying out the reaction for 3 hours at 200°C. to obtain an esterified resin (II-E). The resin (II-E) had a softening point of 144°C. and an acid value of 43.

Resin (II-E) was dissolved in a petroleum type nonaromatic hydrocarbon solvent having an initial boiling point of 80°C. and an end point of 145°C., and a varnish having a resin concentration of 55 weight % was prepared. This varnish had a viscosity of 230 centipoises at 25°C. Benzidine yellow and carbon black were separately added to this varnish to prepare a yellow ink and a black ink, respectively. On measurement of their viscosities one week later, a rise of the order of not more than 10% of the viscosities immediately after the preparation of the inks was noted in both cases, thus indicating the viscosity stability of the inks was satisfactory. When printings were carried out as in Example 1, the printing effects were exceedingly satisfactory, and it was found that the drying speed being sufficiently fast it could be even used satisfactorily as a process ink for superposed printing.

EXAMPLE 3

The same apparatus as that of Example 1 was used, and the flask was charged with 5 grams of anhydrous aluminum chloride and 30 grams of benzene, following which 100 grams of the fraction of a boiling point 160° – 176°C. ($C_5$ heat-reaction mixture) obtained in Example 1 was added with vigorous stirring during a period of 15 minutes. At this time, the solution temperature inside the flask was maintained at 0° – 5°C. After completion of the addition, the polymerization reaction was carried out for 2 hours and 30 minutes at the same temperature. Following completion of the polymerization reaction, the reaction product was treated as in Example 1 to obtain a light yellow resin (III), whose properties were as follows:

| | |
|---|---|
| Resin softening point | 125°C. |
| Color | 5 |
| Bromine value | 63 |

Maleic anhydride was added to resin (II) at the rate of 15 grams (0.153 mol) per 100 grams of the latter, and by operating as in Example 1 an acid-modified resin (III-A) was obtained. The resin (III-A) had a softening point of 146°C. and an acid value of 65. This was followed by adding n-butanol to the so obtained acid-modified resin (III-A) at the rate of 0.75 mol per mol of the maleic anhydride that was added and carrying out the reaction for 3 hours at 200°C. to obtain an esterified resin (III-E). The resin (III-E) had a softening point of 131°C. and an acid value of 46.

A varnish having a resin concentration of 55 weight % was prepared by dissolving the resin (III-E) in the petroleum type nonaromatic hydrocarbon solvent described in Example 1. The viscosity of this varnish at 25°C. was 230 centipoises. Black ink was prepared by adding carbon black to this varnish. When the so prepared ink was measured for its viscosity one week later, there was a rise of no more than 5% in its viscosity as compared with that when measured immediately after its preparation. Its viscosity stability was thus satisfactory. Further, when it was used in printing matter on art paper, it was found to possess fully satisfactory printing effects.

EXAMPLE 4

Anhydrous tetrahydrophthalic acid was added to the resin (III) obtained in Example 3 at the rate of 0.1 mol per 100 grams of the latter, after which the addition reaction was carried out under identical conditions as in Example 1 to obtain an acid-modified resin (IV-A) having a softening point of 143°C. and an acid value of 48. A varnish having a viscosity of 350 poises was prepared by dissolving 100 grams of the so obtained resin (IV-A) in 50 grams of a paraffinic hydrocarbon solvent having an initial boiling point of 192°C. and an end point of 229°C. followed by the further addition of 20 grams of linseed oil. Next, a composition consisting of the following ingredients was compounded on a three-rolled mill to prepare an ink, after which an offset ink test was conducted.

| | Parts by weight |
|---|---|
| Carmine 6B | 16 |
| Varnish | 72 |
| Solvent | 6 |
| Wax compound | 5 |
| Dryer | 1 |

The printing properties such as the stability and antiemulsifiability of the ink on the printing press were satisfactory. Again, when the printing test was carried out with the RI tester, the luster of the printed surface was good and the drying speed was sufficiently fast. This resin was thus found to be fully satisfactory for use as a resin for the preparation of web offset ink.

CONTROL 1

When an ink was prepared as in Example 1 with the resin (I) obtained therein, the pigment separated and settled in 24 hours, and thus a gravure ink could not be obtained.

CONTROL 2

When ethylene glycol was added to the acid-modified resin (II-A) obtained in Example 2 in an amount equimolar to that of the maleic anhydride that was added and reacted for 3 hours at 210°C., only a resin a major portion which was gelled could be obtained.

CONTROL 3

An acid-modified resin obtained by adding maleic anhydride to the resin (I) obtained in Example 1 at the rate of 0.3 mol per 100 grams of the latter and carrying out the addition reaction under identical conditions as in Example 1 was insoluble in n-hexane, n-heptane and cyclohexane.

What is claimed is:

1. A process for preparing a resin suitable for printing ink use which comprises using as the starting oil to be polymerized a mixture selected from the group consisting of a reaction mixture obtained by heating at a temperature of 100° – 300°C. that fraction containing diolefins of 5 carbon atoms and of a boiling point in the range of 20° – 80°C. of the thermally cracked product oil of petroleum fractions and a mixture of said reaction mixture with that fraction of a boiling point in the range of 140° – 280°C. of the thermally cracked product oil of petroleum fractions, polymerizing said selected mixture in the presence of a Friedel-Crafts type catalyst, and thereafter reacting the resulting thermoplastic resin with a compound selected from the group consisting of the unsaturated carboxylic acids and the anhydrides thereof, said compound being used in an amount of 0.01 – 0.2 mole per 100 grams of said thermoplastic resin, thereby forming a resin which is soluble in a nonaromatic hydrocarbon solvent and having a softening point of above 100°C.

2. The process of claim 1 which comprises further reacting said formed resin with a monohydric alcohol, said alcohol being used in an amount of not more than 1.0 mole per equivalent of the carboxyl groups contained in said unsaturated carboxylic acid or per ½ equivalent of the acid anhydride groups contained in said acid anhydride.

3. The process of claim 1 wherein said reaction mixture and said fraction of a boiling point in the range of 140° – 280°C. are mixed in a weight ratio ranging from 0.5 to 20:1.

4. The process of claim 1 wherein said reaction that is carried out by heating at 100° – 300°C. is conducted in an inert solvent.

5. The process of claim 1 wherein said catalyst is used in an amount of 0.1 – 10% by weight based on said starting oil to be polymerized, and said polymerization reaction is carried out at 0° – 80°C.

6. The process of claim 1 wherein said reaction between said thermoplastic resin and said compound selected from the group consisting of the unsaturated carboxylic acids and the anhydrides thereof is carried out at 80° – 300°C.

7. The process of claim 1 wherein said compound selected from the group consisting of the unsaturated carboxylic acids and the anhydrides thereof is a member selected from the group consisting of the monovalent and polyvalent carboxylic acids of 3 – 12 carbon atoms and the anhydrides thereof.

8. The process of claim 7 wherein said unsaturated carboxylic acids and the anhydrides thereof are selected from the group consisting of acrylic acid, methacrylic acid, maleic acid, maleic anhydride, tetrahydrophthalic acid, tetrahydrophthalic anhydride, fumaric acid, citraconic acid and itaconic acid.

9. The process of claim 2 wherein the reaction between said resin and said monohydric alcohol is carried out at a temperature of 150° – 250°C.

10. The process of claim 2 wherein said monohydric alcohol is used in an amount of 0.25 – 1.0 per equivalent of the carboxyl groups contained in said unsaturated carboxylic acid or per ½ equivalent of the acid anhydride groups contained in said acid anhydride.

11. The process of claim 2 wherein said monohydric alcohol is selected from the group consisting of the natural and synthetic saturated and unsaturated monohydric alcohols of 1 – 24 carbon atoms.

12. The process of claim 11 wherein said monohydric alcohol is at least one member selected from the group consisting of methyl alcohol, ethyl alcohol, propyl alcohol, nonyl alcohol, decyl alcohol, lauryl alcohol and oleyl alcohol.

* * * * *